Figures 1, 2:
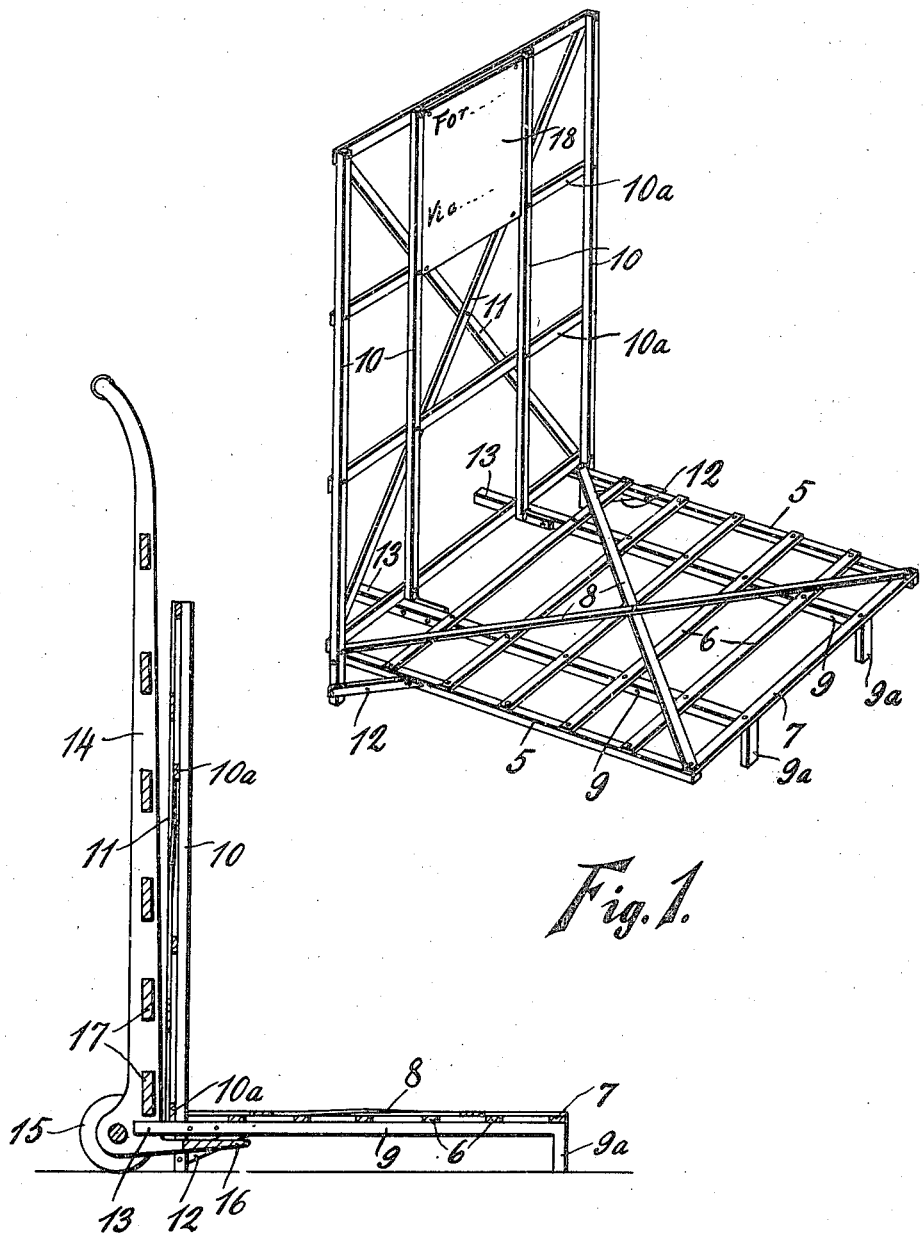

C. GREENE.
LOAD SUPPORTING RACK.
APPLICATION FILED OCT. 16, 1914.

1,142,088.

Patented June 8, 1915.

Witnesses
Einar Larson
A. R. Walton

Inventor
Claude Greene
By Milo B. Knowles
Attorney

UNITED STATES PATENT OFFICE.

CLAUDE GREENE, OF CHICAGO, ILLINOIS.

LOAD-SUPPORTING RACK.

1,142,088.

Specification of Letters Patent.

Patented June 8, 1915.

Application filed October 16, 1914. Serial No. 866,998.

*To all whom it may concern:*

Be it known that I, CLAUDE GREENE, a citizen of the United States, residing at Chicago, in the county of Cook and State of Illinois, have invented certain new and useful Improvements in Load-Supporting Racks, of which the following is a specification.

This invention is a device designed for use in connection with hand trucks for the purpose of facilitating the placing of the load on the truck, whereby the load may be placed on the truck and carried from place to place without being re-handled other than being moved by the truck until final disposition is made of the load; and also to provide for a maximum load of light weight packages to be carried that could not otherwise be handled without the use of a rack or racks being attached to or carried by the truck. This object is attained by means of a novel combination and arrangement of parts to be hereinafter described and claimed, reference being had to the accompanying drawing in which—

Figure 1 is a perspective view of the device and Fig. 2 is a cross section thereof in position on the truck.

Referring specifically to the drawing, the device comprises a rack consisting of a base and an end wall rising from one end thereof. The base of the rack is an open frame composed of spaced longitudinal side bars 5 connected by cross bars 6, and at their front ends by a cross bar 7. The frame also has diagonal braces 8, and it is mounted on spaced longitudinal sills 9 having downturned forward ends 9ª forming feet for spacing the base from the floor, platform or other surface. The end wall of the rack is composed of upright bars 10 secured to and rising from the rear ends of the side bars 5 and the sills 9, and connected by cross bars 10ª, said upright bars extending downward from the side bars a sufficient distance to serve as supporting feet for the rear end of the base of the rack. Diagonal brace bars 11 are also provided, and braces 12 join the lower ends of the end ones of the bars 10 to the side bars 5. The rear ends of the sills 9 project for a short distance rearward of the end wall, as indicated at 13, which is for a purpose to be presently described.

The truck in connection with which the rack is designed to be used is an ordinary one, it being composed of side bars 14 mounted on wheels 15, and having the usual lifting bar or bill 16, and connected by cross bars 17.

In use, the load to be transported is placed on the rack, and as the base of the rack is clear of the floor, platform or other support, the lifting bar 16 of the truck can be run under the base. The truck is pushed forward until the lifting bar comes beneath the base of the rack, and the rear projecting ends 13 of the sills 9 come between lowermost cross bar 17 and the rear portion of the lifting bar, as shown in Fig. 2. The truck is then tilted back, taking the rack and the load thereon with it. To prevent the load from dropping off the rack it may be tied on. The rack and the load thereon being now on the truck, the same may be transported to the place desired and dumped off by tilting the truck forward in the ordinary manner.

It will be noted that the rack is entirely independent of the truck and no change in the structure of the latter is necessary, and its use for handling large packages in the ordinary manner is not interfered with. A large number of small packages may be placed on the rack, and the latter therefore saves time and several re-handlings, and also prevents damage and displacement of the wrapping and the contents of the packages liable to be caused by re-handling. The load can be placed in a wagon, dray or other conveyance without removing it from the rack, the latter being placed in the conveyance with the load remaining thereon. The skeleton construction of the rack permits the loading of tubs, kegs and other round objects thereon without danger of the same slipping off.

The end wall of the rack is provided with sign board 18 to show the destination or disposition to be made of the goods or packages.

I claim:—

1. A rack of the character described comprising a base, a rear end wall rising from the base, and sills supporting the base, said sills having projecting rear ends extending beyond the aforesaid end wall.

2. A rack of the character described comprising a base, a rear end wall rising from the base, and sills supporting the base, said sills having projecting rear ends extending beyond the aforesaid end wall, the forward ends of the sills having feet, and the end wall having parts which extend downward below the base and coöperate with the feet to support the base in raised position.

In testimony whereof I affix my signature in presence of two witnesses.

CLAUDE GREENE.

Witnesses:
MARIE LAUPER,
S. J. LEHRER.